Feb. 11, 1964  C. A. REDMER  3,121,001
AIR BUSHING IN PLASTICS EXTRUSION
Filed March 21, 1961

INVENTOR.
CARL A. REDMER
BY
ATTORNEY

United States Patent Office 3,121,001
Patented Feb. 11, 1964

3,121,001
AIR BUSHING IN PLASTICS EXTRUSION
Carl A. Redmer, Cranford, N.J., assignor to Carmer Industries, Inc., Kenilworth, N.J., a corporation of New Jersey
Filed Mar. 21, 1961, Ser. No. 97,198
1 Claim. (Cl. 34—155)

This invention deals with an air bushing through which freshly-extruded plastic rods are passed to be air-chilled. More specifically, it relates to a rotating bushing in which the air openings are disposed in series forming a helical type curve along one half of the periphery of the bushing.

When plastic rod is extruded through an extrusion die, the still-soft rod is generally surface-cooled by passing it through a bushing from which air is blown onto the rod. At present, such bushings are stationary hollow chambers, the inside wall of which is provided with a linear row of holes through which the air is blown onto the surface of the moving extruded rod. This chilling is intended to case-harden the rod and thus improve its mechanical properties.

When using bushings now available in the art, it has been found that resulting extruded rod quality is not uniform. Very often, particularly when nylon and urea resin rods are extruded, the surface of the rod exhibits pock marks, warping, and the like.

By means of the present invention, it has been possible to improve the rod quality considerably and to eliminate the surface defects and warping to a point where they now become negligible. According to the present invention, the rod is passed through a rotating air bushing having a row of air jet openings or holes disposed in a manner so that each successive opening is farther from the rod point of entry than the preceding one. As the bushing rotates, the rod is cooled, not a single area at once, but it is air-swept progressively along its entire area, whereby an exceptionally uniform case hardening effect is obtained. A helical row of air holes in the bushing is preferred and, since the bushing is continuously rotated, the holes need be provided over only one-half of the width (semi-circumference) of the bushing, as long as the holes extend along the entire length thereof.

Figure 1:
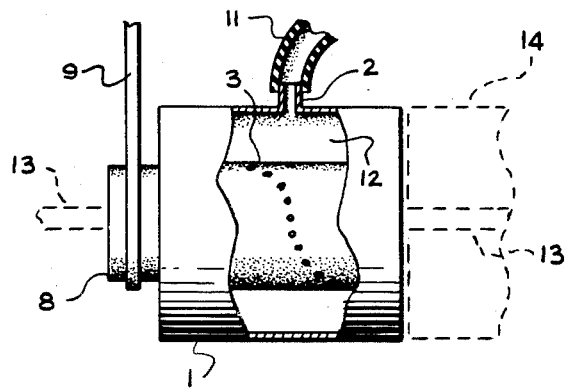
Figure 2:
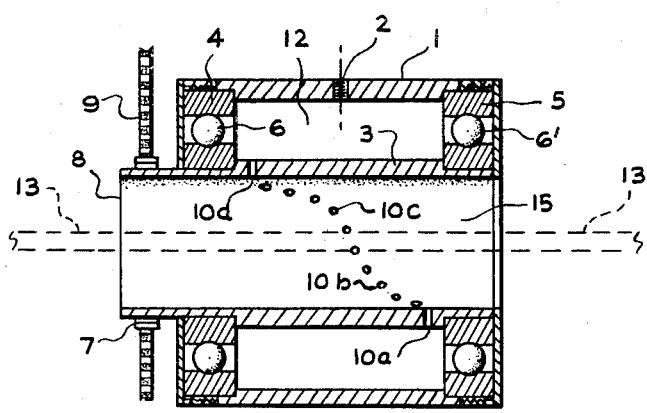
Figure 3:
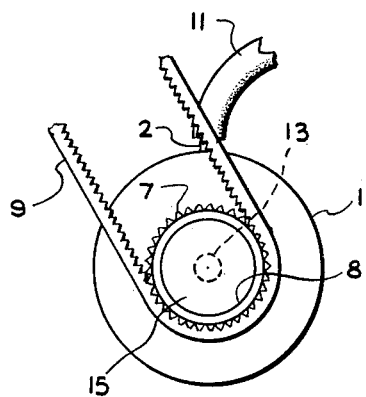

The invention will be more readily understood by reference to the accompanying drawing in which a preferred embodiment is described, and in which FIGURE 1 depicts a side view of a bushing of the present invention with the central portion cut away. FIGURE 2 illustrates a cross-sectional side view of the unit depicted in FIGURE 1, while a front view thereof is shown in FIGURE 3. Similar numerals refer to similar parts in the various views.

Referring again to the drawing, numeral 1 represents a stationary cylindrical shell having an air inlet 2 in its wall. Mounted in rotating relation to shell 1 is concentric shell 3. Circular bearings 4 and 5, provided with ball bearings 6 and 6', are disposed at each end of the cylindrical assembly in air sealing relation to the shells and in a manner such that shell 3 is capable of being rotated within shell 1. This is accomplished by extending forwardly shell 3 beyond shell 1 and providing a sprocket circle 7 on extension 8 of shell 3. Sprocket chain 9 is employed for effecting the rotation.

Drilled through the wall of shell 3 is a series of jet holes 10a, 10b, 10c, 10d disposed along a helical line starting from the innermost accessible point 10a to the outermost point 10d, the helical line covering substantially completely one-half of the circumferential area of shell 3. Air is fed into inlet 2 through hose 11.

When in operation, sprocket chain 9 is driven by a motor (not shown) and, through sprocket ring 7, it rotates inner shell 8 on roller bearings 4—5 mounted at the ends of stationary outer shell 1. Compressed air enters annular reservoir 12 and discharges through the small holes 10a–10d.

As plastic rod 13 is extruded from die 14, it enters chamber 15 into which the air jets are discharged. The rotation of shell 3 produces a progressively sweeping effect of spiral waves of cold air over the surface of the hardening plastic, which effect provides a uniform, evenly-stressed, case-hardened rod of exceptionally constant and flawless quality.

It has been found that a set of four bushings will easily handle extruded rods of up to 2" diameter. For example, for extruded rods up to 1–1½" diameter, the bushing can have an outer diameter of about 5" and a length of about $3^{13}/_{16}$" for shell 1, and an inner diameter of about $2^{3}/_{16}$" and length of 2¾" for shell 3. The effective length (perforated length) of shell 3 is about 2½", with an extension 8 of about ¾". Overall length of the entire bushing, including bearings, thus would be about a little over 5". Sixteen holes $1/_{16}$" in diameter are drilled in a helical line over one side (semi-circumference) of shell 3, so that the angular distance between holes on the $2^{13}/_{16}$" O.D. shell would be 4° 30', and the axial distance between holes would be $1/_{16}$". Air inlet hole 2 on shell 1 would be ¼" diameter, and it would be centrally-disposed. In order to prevent excessive by-passing of air through the jet holes directly opposite opening 2, it is preferred to omit the $1/_{16}$" holes for a central area length of about ⅝" on shell 3 directly opposite opening 2, although in this area, even smaller holes of $1/_{32}$" or $1/_{64}$" may be substituted if desired.

The length of shell 3 should be at least twice the diameter of the rod being extruded, and there should be an annular distance of about ½" to 1", more or less, between the rod surface and the inner wall of shell 3.

The speed of rotation of the bushing is slower for smaller diameter rods, the speed range being roughly 30 to 100 r.p.m. for rods ranging from ¼" to 2", assuming an extrusion rate range of about 600 f.p.h. for ¼" rods to 100 f.p.h. for 1½–2" rods. Air pressure is preferably 40 p.s.i., but it is preferably reduced to 20–25 p.s.i. for smaller rods, such as those of ¼" diameter. Also, the jet holes 10a–10d may be spaced farther apart for smaller size rods, e.g., they may be as far apart as ⅛" for ¼" diameter rods.

I claim:
An air bushing of the class described, comprising,
a larger stationary outer shell,
a small circular inner shell disposed concentrically within said larger shell and providing an annular space between the shells,
bearings mounted at each end of said shells in air-sealing relation and in a manner permitting said smaller shell to be rotated within said larger shell,
rotating means for rotating said smaller shell,
a series of small holes penetrating said smaller shell and arranged in a helical line over one-half of the circumferential width thereof, the other half of said surface being imperforate, and an air inlet penetrating said larger shell and serving as the air supply for air jets dischargeable from said small holes.

References Cited in the file of this patent

UNITED STATES PATENTS

| | | |
|---|---|---|
| 2,252,684 | Babcock | Aug. 19, 1941 |
| 2,632,206 | Pierce | Mar. 24, 1953 |
| 2,947,031 | Ho Chow et al. | Aug. 2, 1960 |
| 2,952,874 | Doyle | Sept. 20, 1960 |

FOREIGN PATENTS

| | | |
|---|---|---|
| 716,160 | Great Britain | Sept. 29, 1954 |
| 805,858 | Great Britain | Dec. 17, 1958 |